T. H. HAM.
BRAKE MECHANISM.
APPLICATION FILED APR. 10, 1919.
1,335,495.
Patented Mar. 30, 1920.
2 SHEETS—SHEET 1.
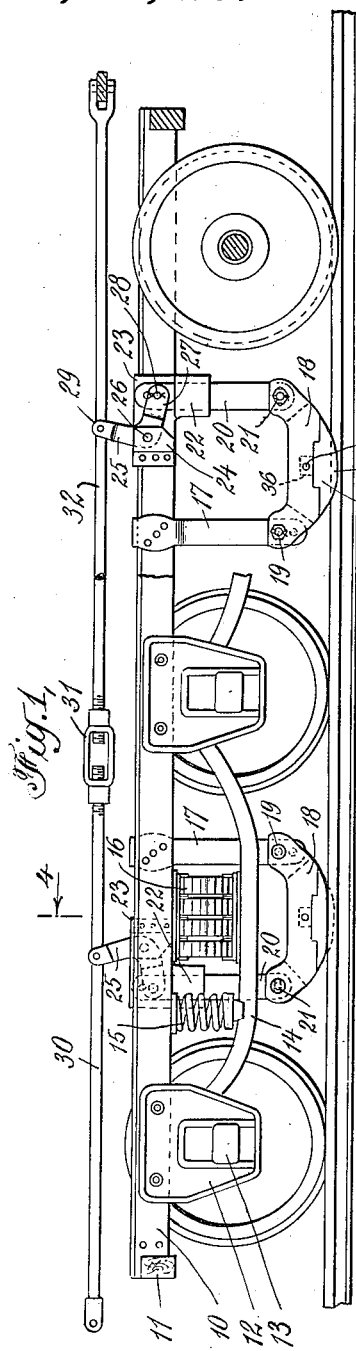
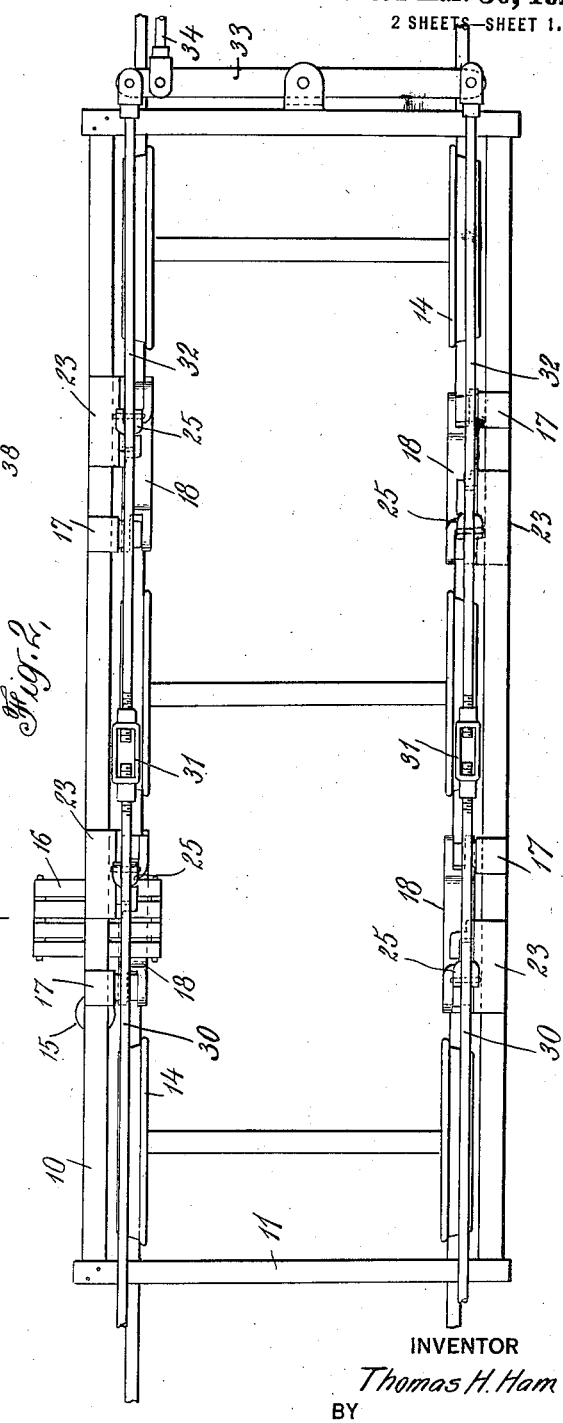
INVENTOR
Thomas H. Ham
BY
Pennie, Davis, Marvin & Edmonds
ATTORNEYS.

T. H. HAM.
BRAKE MECHANISM.
APPLICATION FILED APR. 10, 1919.
1,335,495.
Patented Mar. 30, 1920.
2 SHEETS—SHEET 2.
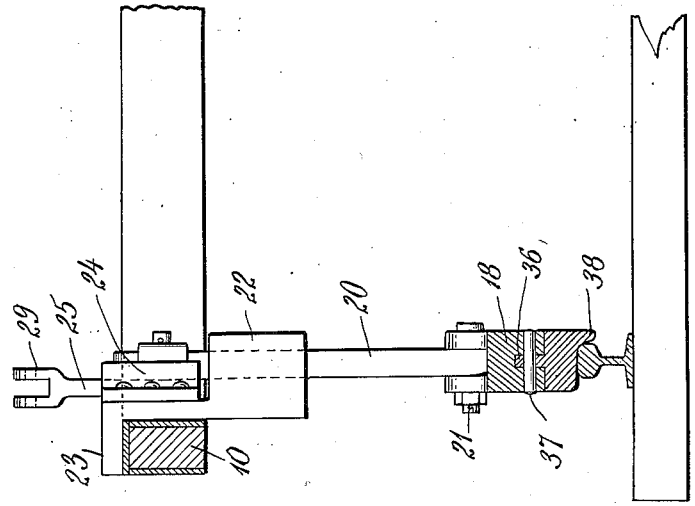
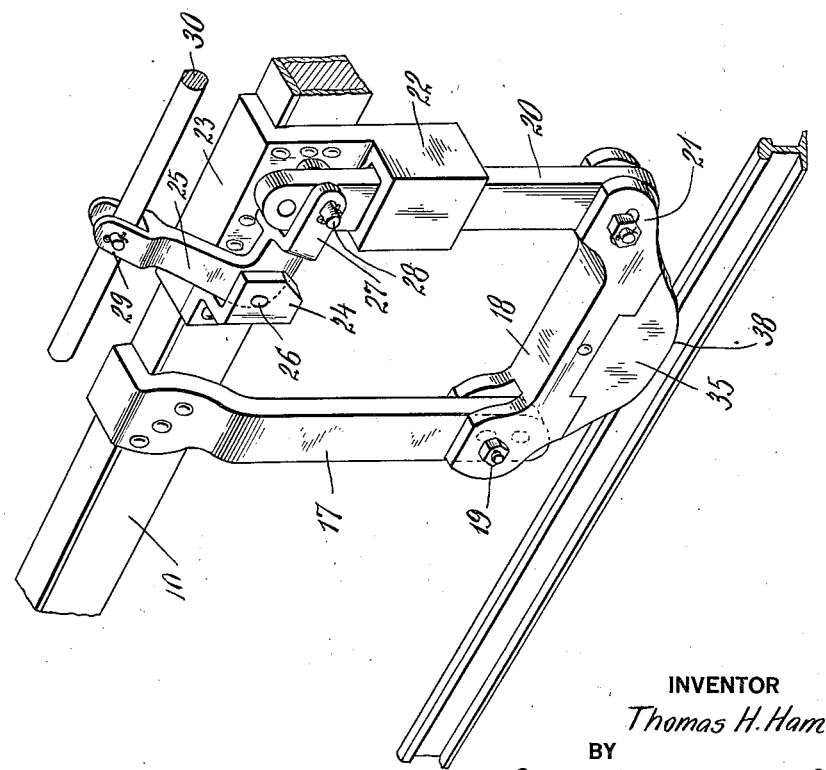
INVENTOR
Thomas H. Ham
BY
ATTORNEYS.

UNITED STATES PATENT OFFICE.

THOMAS H. HAM, OF ALBANY, NEW YORK.

BRAKE MECHANISM.

1,335,495.   Specification of Letters Patent.   Patented Mar. 30, 1920.

Application filed April 10, 1919. Serial No. 289,111.

*To all whom it may concern:*

Be it known that I, THOMAS H. HAM, residing at Albany, in the county of Albany, State of New York, have invented certain new and useful Improvements in Brake Mechanism; and I do hereby declare the following to be a full, clear, and exact description of the invention, such as will enable others skilled in the art to which it appertains to make and use the same.

This invention relates to vehicle brake mechanism of the type in which brake shoes are adapted to be brought into engagement with the rails upon which the vehicle travels, and by frictional contact therewith reduce or stop movement of the vehicle.

It is an object of the invention to provide brake mechanism of this character in which a plurality of rail brake shoes may be applied to the trucks of a car or other vehicle in such a manner that all of the shoes may be operated by a common system of rods and levers to produce the most effective braking action, while serving to equalize retarding and other strains throughout the system. The mechanism is of rugged, yet simple construction, and provides for the take-up of wear and tear on the brake shoes and their actuating rods and levers. The mechanism may be applied to existing types of trucks, without modifying the usual elements of the trucks. It is adapted to positively maintain the brake shoes in normal elevated position to clear the rails and any projections or obstructions adjacent the same, but the shoes may be quickly and effectively applied to the rails by a comparatively slight movement of the actuating rods and levers.

The particular nature of the invention, as well as other objects and advantages thereof, will appear more clearly from a description of a preferred embodiment, and for the purpose of illustration, the invention is shown in combination with a standard form of six wheel truck, although it will be understood that it is equally applicable to any other type of truck. In the accompanying drawings—

Figure 1 is an elevation of a truck having four brake units applied thereto, the figure being so drawn as to show both external and internal views of the brake mechanism;

Fig. 2 is a plan view of the truck;

Fig. 3 is an enlarged perspective view of one of the brake units and

Fig. 4 is a transverse sectional view through the unit.

Since the invention may be applied to trucks of any type, only sufficient elements of the truck have been shown to illustrate clearly the manner in which the invention is applied thereto. The truck frame comprises the usual wheel beams 10, connected by end sills 11, and having pedestals 12 for receiving the journal boxes 13 of the wheels. Connected between the journal boxes are equalizer bars 14 upon which are mounted the equalizing springs 15. The truck is also provided with main or burden springs 16. The above parts are all of usual construction and it is unnecessary to describe the same in detail.

The several units of the brake mechanism are of identical construction, and each comprises a depending member or bar 17 attached at its upper end to the inner face of the wheel beam of the truck and preferably bent over the top of the latter. To the lower end of the bar 17 is secured one end of a rail brake shoe supporting member 18. For the purpose of providing an adjustable connection, the lower end of the bar 17 should be provided with a number of holes through any one of which a bolt 19 for attaching member 18 may be inserted. The other end of member 18 is connected to a second depending member or bar 20 by means of a bolt 21. The bar 20 passes through a socket 22 depending from a member 23 which is attached to the inner face of the wheel beam 10. The hole in the lower end of bar 20, through which bolt 21 passes should be elongated to allow for the arc described by the end of member 18. Projecting from the inner face of the member 23 is a bracket 24, and between this bracket and the member 23 is mounted a bent lever 25 upon a pin 26 passing through the bracket and into the member 23. The lower end of lever 25 is forked as at 27 to receive the upper end of the bar 20, which is preferably provided with a number of holes through any one of which may be inserted a connecting pin or bolt 28. The upper end of lever 25 is likewise forked as at 29 to provide for the connection of an actuating rod 30 which extends lengthwise of the truck and by means of a turn buckle 31 is connected to a corresponding rod 32 which is in turn connected to the lever 25 of the other brake unit on the same side of the truck, in case two brake units are employed. The units on one side of the truck are arranged with the bars 20 and levers 25 lying toward one end of the truck, while the units on the other side of the truck are arranged with the corresponding members lying toward the other end of the truck, as appears most clearly in Fig. 2. The connecting rods 30 and 32 on each side of the truck are connected to a lever 33 pivoted to one of the end sills of the truck and provided with a rod 34 connected to the piston of an air brake system, which, since it may be of any suitable construction, is not shown herein. The brake mechanism may be operated by electrical apparatus or in any other way, instead of by air. As a further safeguard, the lever 33 should also be connected to hand wheels which may be employed for setting the brakes in case of emergency.

The brake shoes 35 which are formed of iron, steel or other suitable metal, are arranged to be detachably secured to the brake shoe supporting members 18, in order that the shoes may be replaced when they become worn or removed for repair. The connection is effected by providing the shoe with a tenon 36 which fits within a corresponding mortise in the member 18, the parts being held together by a pin 37. The bottom of the brake shoe is somewhat wider than the top of the rail, and an arcuate flange 38 projects from the inner face of the shoe in position to engage the inner face of the rail. This flange is preferably given a contour similar to that of the flanges of the car wheels.

In the use of the brake mechanism described above, the brake shoe supporting members 18 are attached to the rods 17, and the slidable rods 20 are so connected to the levers 25 that the brake shoes are elevated sufficiently above the rails when the mechanism occupies its normal position. By means of the turn buckles 31, the operating connections between the levers 25 of the units on each side of the truck may be adjusted so that when the connecting rods are actuated from the lever 33, all of the brake shoes will be depressed into contact with the rails by swinging the levers 25. On account of the fact that the connecting rods 30—32 on each side of the truck are connected to opposite ends of the actuating lever 33, one of these sets of connecting rods will move in one direction, while the other will move in the opposite direction as the lever 33 is actuated from the brake setting mechanism of the apparatus. It is for this reason that the operating levers 25 on one side of the truck are arranged reversely to the corresponding levers on the other side of the truck. It results from the above construction that when the lever 33 is operated, all of the slidable members 20 will be depressed by their corresponding levers 25, and all of the brake shoes will be forced into contact with the tops of the rails, the contact pressure depending upon the force applied to the brake system by the actuating apparatus. The flanges 38 will aid in keeping the shoes upon the rails and also increase their frictional engagement therewith.

If any of the brake shoes become damaged or worn in service, they may be easily removed and new ones substituted without dismantling any of the other parts of the apparatus, or without even removing the supporting members 18 from the rods to which they are connected. It is thus possible to replace worn or damaged brake shoes without altering the adjustments of any other parts of the apparatus. While the invention has been applied to one standard form of truck, it will be understood that it is equally applicable to trucks of other forms, and also that various changes in the details of construction of the mechanism may be made without departing from the principle of the invention as defined in the appended claims.

I claim:

1. In brake mechanism, the combination of a depending member attached to the frame of a vehicle truck, a rail brake shoe attached for pivotal movement at one end to the member, a member attached to the other end of the rail brake shoe and slidably mounted on the truck frame and means for actuating the last named member to force the brake shoe into contact with the rail, said same means also functioning to lift it therefrom.

2. In brake mechanism, the combination of a depending member attached to the frame of a truck, a rail brake shoe pivotally attached to the lower end of the depending member, a second depending member pivotally attached to the brake shoe and slidably mounted on the truck frame, and means for actuating the last named member to force the brake shoe into contact with a rail, said same means also functioning to lift it therefrom.

3. In brake mechanism, the combination of a depending member attached to the frame of a truck, a socket member attached to the frame of the truck, a member slidably mounted in the socket member, a rail brake shoe supporting member connected to the lower end of the depending member and to the lower end of the slidably mounted member, a brake shoe detachably secured to the brake shoe supporting member, and a lever connected to the upper end of the slidably mounted member for actuating the same to force the brake shoe into contact with the rail or lift it therefrom.

4. In brake mechanism, the combination of a depending member fixed to the frame of a truck, a rail brake shoe supporting member attached to the lower end of the depending member and provided with a mortise, a brake shoe provided with a tenon, adapted to fit within the mortise, means passing through the brake shoe supporting member and the tenon for holding the brake shoe on the supporting member, a second depending member slidably mounted on the truck frame and to the lower end of which the brake shoe supporting member is attached, and means connected to the upper end of the second depending member for actuating the same to force the brake shoe into contact with a rail, said same means also functioning to lift it therefrom.

5. In brake mechanism, a truck frame supported on a plurality of wheels, rail brake shoe units mounted on the side members of the frame between the wheels, each of the units comprising a depending member attached to the truck frame, a rail brake shoe pivoted at one end to the lower end of the depending member, a member attached to the other end of the brake shoe and slidably mounted on the truck frame, levers connected to the upper ends of the slidable members, a series of operating rods connecting the levers of the units on each side of the truck, and means connected to both series of operating rods for causing the simultaneous operation of all of the levers to force the brake shoes into contact with the rails.

6. In a car truck having a frame supported upon a plurality of pairs of wheels by means of burden springs and composed of a pair of wheel beams connected by transverse sills, the combination of depending members attached to the inner faces of the wheel beams on one side of each of the burden springs, a second depending member associated with each of the first named depending members and slidably mounted upon the inner face of the wheel beams on the other side of the corresponding burden spring, a rail brake shoe connected between the lower ends of each pair of coöperating depending members below the corresponding burden spring, a lever connected to the upper end of each slidably mounted depending member, connecting rods for the levers on each side of the truck and actuating mechanism attached to the rods for swinging the levers to elevate or depress the brake shoes.

7. In brake mechanism, the combination of a depending member attached to the frame of a vehicle truck, a rail brake shoe attached for pivotal movement at one end to the member, a member attached to the other end of the rail brake shoe and mounted on the truck frame and means for actuating the last named member to force the brake shoe into contact with the rail, said same means also functioning to lift it therefrom.

8. In brake mechanism, a truck frame supported on a plurality of wheels, rail brake shoe units mounted on the side members of the frame, each of the units comprising a depending member attached to the truck frame, a rail brake shoe pivoted to the lower end of the depending member, an actuating member attached to the brake shoe and mounted on the truck frame, levers connected to the upper ends of the actuating members, a series of operating rods connecting the levers of the units on each side of the truck and means connected to both series of operating rods for causing the simultaneous operation of all of the levers to force the brake shoes into contact with the rails.

In testimony whereof I affix my signature.

THOMAS H. HAM.